(12) United States Patent
Cofini

(10) Patent No.: US 9,034,178 B2
(45) Date of Patent: May 19, 2015

(54) FLUID FILTER ASSEMBLY WITH SIGHT GLASS

(76) Inventor: Michael E. Cofini, Spokane, WA (US)

(*) Notice: Subject to any disclaimer, the term of this patent is extended or adjusted under 35 U.S.C. 154(b) by 167 days.

(21) Appl. No.: 13/460,671

(22) Filed: Apr. 30, 2012

(65) Prior Publication Data
US 2012/0279911 A1 Nov. 8, 2012

Related U.S. Application Data

(60) Provisional application No. 61/518,548, filed on May 9, 2011, provisional application No. 61/518,213, filed on May 3, 2011.

(51) Int. Cl.
| B01D 35/147 | (2006.01) |
|---|---|
| B01D 35/30 | (2006.01) |
| B01D 29/05 | (2006.01) |
| B01D 25/00 | (2006.01) |

(52) U.S. Cl.
CPC .............. B01D 35/30 (2013.01); B01D 29/055 (2013.01); B01D 35/147 (2013.01); B01D 2201/0415 (2013.01); B01D 2201/309 (2013.01)

(58) Field of Classification Search
None
See application file for complete search history.

(56) References Cited

U.S. PATENT DOCUMENTS

| 2,145,304 | A | | 1/1939 | Hill | |
|---|---|---|---|---|---|
| 2,611,448 | A | | 9/1952 | Walls | |
| 2,611,848 | A | | 9/1952 | Smith | |
| 3,333,703 | A | * | 8/1967 | Scavuzzo et al. | 210/232 |
| 3,352,197 | A | * | 11/1967 | Porges et al. | 356/36 |
| 3,681,562 | A | * | 8/1972 | Winzen | 210/94 |
| 3,827,558 | A | | 8/1974 | Firth | |
| 4,446,017 | A | * | 5/1984 | Oberg | 210/90 |
| 4,717,472 | A | | 1/1988 | Oberg | |
| 5,064,530 | A | | 11/1991 | Duff | |
| 5,171,430 | A | | 12/1992 | Beach | |
| 5,690,814 | A | | 11/1997 | Holt | |
| 6,555,000 | B2 | * | 4/2003 | Knight | 210/416.4 |
| 6,641,742 | B2 | | 11/2003 | Prater | |
| 6,728,988 | B2 | * | 5/2004 | Chaffee et al. | 15/3.51 |
| 6,841,065 | B2 | | 1/2005 | Smith | |
| 7,393,455 | B1 | | 7/2008 | Tondreau | |
| 8,147,691 | B2 | | 4/2012 | Krull | |

OTHER PUBLICATIONS

"canister." Dictionary.com Unabridged. Random House, Inc. Jun. 26, 2014. <Dictionary.com http://dictionary.reference.com/browse/canister>.*
"cartridge." Dictionary.com Unabridged. Random House, Inc. Jun. 26, 2014. <Dictionary.com http://dictionary.reference.com/browse/cartridge>.*

* cited by examiner

*Primary Examiner* — Katherine Zalasky
*Assistant Examiner* — Kara Graber
(74) *Attorney, Agent, or Firm* — William A. Jeckle

(57) ABSTRACT

A fluid filter assembly with sight glass provides an upper housing carrying a transparent sight glass for visualizing the interior of the filter assembly and fluids passing therethrough. A sight glass retainer secures the sight glass within the upper housing. A screen filter is carried between the upper housing and a mating lower housing. A fluid inlet port is defined in the upper housing above the screen filter and a fluid output port is defined in the lower housing below the screen filter. The sight glass retainer carries plural fluid deflectors and plural sight glass supports for fluid dispersion and fluid cooling. A pressurized air input communicating with fluid inlet port allows pressurized air to be injected into the assembly to force fluids through the screen filter and out of the filter assembly. A low pressure drain valve and a bypass valve are carried in the lower housing.

9 Claims, 14 Drawing Sheets

FLUID FILTER ASSEMBLY WITH SIGHT GLASS

RELATED APPLICATIONS

This application claims the benefit of earlier filed U.S. Provisional Patent Application No. 61/518,548 titled FLUID FILTER ASSEMBLY WITH SIGHT GLASS filed on May 9, 2011, and also earlier filed U.S. Provisional Application No. 61/518,213, titled FLUID FILTER ASSEMBLY WITH SIGHT GLASS, filed on May 3, 2011. By this reference, the entire contents of the aforementioned two Provisional patent applications are incorporated herein.

BACKGROUND OF INVENTION

1. Field of the Invention

The present invention relates generally to filters, and more specifically to a fluid filter assembly for filtering fluids such as oils, fuels and lubricants.

2. Background of the Invention and Description of the Prior Art

Filters for the removal of particulates and contaminants from fluids are known. Likewise, filters for filtering oils, fuels and lubricants delivered to internal combustion engines, transmissions and other mechanical apparatus are known. The purpose and object of such filters is to remove dirt, debris and particulates that accumulate during operation and also to remove debris "thrown off" the mechanical components of the apparatus during operation. The filters separate and segregate the particulates, dirt and debris from the fluid to prevent those items from causing wear and damage to the mechanical apparatus, while permitting the fluids to continually flow through the filter for lubrication and cooling. Although there has been tremendous advancements in filter technology over the years, at least two problematic aspects of filtering fluids have remained unresolved, first determining when a fluid filter has become plugged with dirt, contaminants and particles such that the flow of lubricant therethrough is diminished/restricted, and second determining what has caused the filter to become plugged (e.g. dirt from normal usage or particulates that could be indicative of a failing component).

A variety of means and methods to detect when a fluid filter is becoming plugged with contaminants and the like have been developed. Most such means and methods use a change of fluid pressure to warn the user that the filter is becoming plugged. The change in fluid pressure may be an increase in fluid pressure going into the filter, or decrease in fluid pressure coming out of the filter. Other means rely on inspection windows or transparent construction of the filter to visualize the condition of the fluid passing therethrough.

Although sight windows and transparent construction have provided means to inspect some fluids, many sight windows and transparent construction methods have remained ineffective when the fluid to be inspected is opaque, such as engine oil, and modern lubricants that have a variety of additives therein. Opaque fluids make it impossible for a user to visualize contaminants or particles on a filter element without draining the fluid from the fluid filter assembly and the mechanical apparatus, which is a significant portion of the work involved with changing the fluid entirely. At least partially because of these continuing problems, most fluid filters are disposable and are replaced when the fluid is changed without any inspection of the filter element itself for particulates that may be indicative of a potential mechanical failure. Further, dirty/used fluid filters are classified as hazardous waste and proper disposal thereof is expensive.

Engine failures are commonly a result of bearing failure caused by lack of lubrication and lack of cooling. When lubricant flow ceases, or is significantly diminished, such as when a oil filter becomes "plugged" the bearings suffer excessive wear and generate excessive heat that exacerbates the wear and can ultimately lead to mechanical failure of the components and catastrophic engine damage. In other instances, mechanical components may fail and the operator will not be aware of the occurring failure until after a catastrophic event which may cost significant amounts of money to repair.

The fluid filter with a sight glass overcomes various of these problems by providing a fluid filter assembly having a first housing carrying a transparent sight glass, a screen filter visible through the sight glass, and a second housing sealed to the first housing and carrying a low pressure drain valve and a bypass valve.

The fluid filter assembly with sight glass is an early warning device allowing a user to determine if a problem is developing within a mechanical apparatus. In some instances the fluid filter assembly may allow a user to determine which particular component is the failing. For instance, if bearing material, or valve spring material is present on the filter element, it is indicative of those components failing.

The filter assembly flows fluid through an inlet opening then into plural radially spaced arcuate openings defined in a sight glass retainer that function as separate filters within the assembly. Each arcuate opening communicates fluid onto a portion of a screen filter exposed by each arcuate opening. The fluid flows through the filter element into mating arcuate recesses defined in a lower housing. The arcuate recesses in the lower housing communicate with plural fluid passages and with an outlet passage. The plural arcuate openings defined in the sight glass retainer have vertically extending fluid deflectors adjacent edge portions of the arcuate openings which catch dirt, contaminants and particulates, and distribute the fluid, dirt, contaminants and particles across the surface of the screen filter. The plural openings function as individual filters. If the screen filter of one opening becomes plugged the fluid will still flow through the remaining openings that have not plugged. In the event the entire screen filter becomes plugged sufficiently to restrict the flow of fluid through the screen filter, the fluid filter assembly has a bypass valve. The bypass valve will open if the pressure of the fluid rises to a predetermined pressure. When the bypass valve opens it allows fluid to flow therethrough without passing through the screen filter. Even though the fluid passing through the bypass valve is not being filtered it will still tend to prevent catastrophic failure caused by a complete absence of fluid flow.

The fluid filter assembly provides a means to visualize the screen filter element regardless of the type of fluid being filtered without the need to drain the fluid from the fluid system. The fluid filter assembly also has a low pressure drain valve which functions responsive to fluid pressure. When the filter assembly is pressurized, the low pressure drain valve closes forcing the fluid through the screen filter and out through the outlet opening and to the apparatus to which the fluid filter assembly is attached, e.g. an internal combustion motor. When fluid pressure is removed (e.g. the internal combustion motor is turned off), the low pressure drain valve opens which allows the fluid to flow out of the filter assembly and into a fluid reservoir, such as an oil pan. The fluid filter assembly also has a pressurized air input valve that allows a user to inject pressurized air into the filter assembly from a position above the screen filter which forces the fluid through the screen filter, and out through the outlet opening allowing a user to inspect the screen filter for contaminants and particulates. Pressurized air input eliminates the need to plumb an additional drain line to drain the assembly and forces opaque and/or viscous fluids through the screen filter leaving particulates and contaminants visible to a user for inspection and identification.

In a second embodiment the fluid filter assembly is modified to carry a removable disposable fluid filter on a bottom portion of the filter assembly. The addition of a removable disposable filter allows a user to filter microscopic particles out of a fluid and still allow a user to visually inspect the fluid and the screen filter for any larger particles trapped on a screen filter element visible through the sight glass. Other types of replaceable disposable fluid filters such as water separator may likewise be installed if a user desires to remove water from the fluid being filtered.

The ability to use a removable disposable fluid filter is important because various vehicle and equipment warranties may be voided unless a specific type of disposable fluid filter is used. The second embodiment of the filter assembly resolves this need for the user who wants to visually inspect for particles filtered out of a fluid and remain protected by vehicle or equipment warranties. The instant fluid filter will also extend the useful life of a disposable filter.

Some or all of the drawbacks and problems explained above, and other drawbacks and problems, not yet known or recognized may be helped or solved by the invention shown and described herein. The invention may also be used to address other problems not set out herein or which become apparent at a later time. The future may also bring to light unknown benefits which may be in the future appreciated from the novel invention shown and described herein.

The invention does not reside in any one of the identified features individually, but rather in the synergistic combination of all of its structures, which give rise to the functions necessarily flowing therefrom as hereinafter specified and claimed.

SUMMARY OF THE INVENTION

The fluid filter assembly with sight glass provides a first upper housing carrying a transparent sight glass therein for visualizing the interior of the filter assembly. A sight glass retainer secures the sight glass inside the first upper housing and communicates with a screen filter carried between the first upper housing and a second lower housing. A fluid input port is defined in the upper housing and a fluid output port is defined in the lower housing. The sight glass retainer defines plural spacedly arrayed arcuate opening and plural sight glass supports on an upper surface that provide fluid dispersion and fluid cooling. A pressurized air input communicating with the fluid inlet port allows pressurized air to be injected into the assembly to force opaque and/or viscous fluids through the screen filter. A low pressure drain valve and a bypass valve are carried in the lower housing.

In providing such a fluid filter assembly with sight glass it is:

a principal object to provide such a fluid filter assembly that allows a user to visually inspect the filter element and the contaminants and particulates removed from the fluid without the need of draining, leaking, or the loss of any fluid out of the fluid system and without the need to unbolt or loosen any fasteners, fittings, or hoses.

a further object to provide a fluid filter assembly that does not obstruct or restrict fluid flow when the filter element is plugged with dirt, contaminants and particulates.

a further object to provide such an assembly that is usable with a variety of fluids.

a further object to provide such an assembly that is easy to install and incorporate into a variety of fluid filtering applications and may be remotely mounted.

a further object to provide such an assembly that has multiple fluid inlet ports and fluid outlet ports to accommodate a variety of applications and eliminate the need for multiple filters.

a further object to provide such an assembly that withstands high fluid pressures and high flow volumes without restricting fluid flow.

a further object to provide such an assembly that is operable under positive pressure as well as negative pressure.

a further object to provide such an assembly that uses a replaceable stainless steel wire mesh screen filter element.

a further object to provide such an assembly using a filter element that is customizable for the size of particle desired to be filtered from the fluid.

a further object to provide such an assembly that allows a user to examine the particulates and contaminants collected on the filter screen to decipher if the particulates and contaminants are from normal operation or if the particulates and contaminants are evidence of failure of mechanical components.

a further object to provide such an assembly that is an early warning device for mechanical failure.

a further object to provide such an assembly having a bypass valve allowing fluids to bypass the screen filter element if the screen filter element becomes sufficiently plugged to restrict fluid flow therethrough.

a further object to provide such an assembly having a low-pressure drain valve that closes when the system is operating and opens when pressure is removed allowing the fluid to drain to a fluid reservoir.

a further object to provide such an assembly having a pressurized air input port to clear the assembly of fluid for visual inspection of the filter screen.

a further object to provide such an assembly that allows the screen element to be removed, cleaned or replaced without the need to drain the fluid system or causing loss of fluid from the system.

a further object to provide such an assembly where it is nearly impossible to install a screen filter incorrectly.

a further object to provide such an assembly that is made out of materials that can be recycled and produced out of recycled materials.

a further object to provide such an assembly that eliminates the need for disposable filters that are hazardous waste.

a further object to provide such an assembly that accepts a disposable filter cartridge to satisfy manufacturer warranties.

a further object to provide such an assembly that may extend the useful life of a disposable filter.

Other and further objects of the invention will appear from the following specification and accompanying drawings which form a part hereof. In carrying out the objects of the invention it is to be understood that its structures and features and steps are susceptible to change in design and arrangement and order with only one preferred and practical embodiment of the best known mode being illustrated in the accompanying drawings and specified as is required.

BRIEF DESCRIPTION OF THE DRAWINGS

Specific forms, configurations, embodiments and/or diagrams relating to and helping to describe preferred versions of the invention are explained and characterized herein, often with reference to the accompanying drawings. The drawings and all features shown therein also serve as part of the disclosure of the invention, whether described in text or merely by graphical disclosure alone. Such drawings are briefly described below.

DESCRIPTION OF PREFERRED EMBODIMENT

Figure 1:
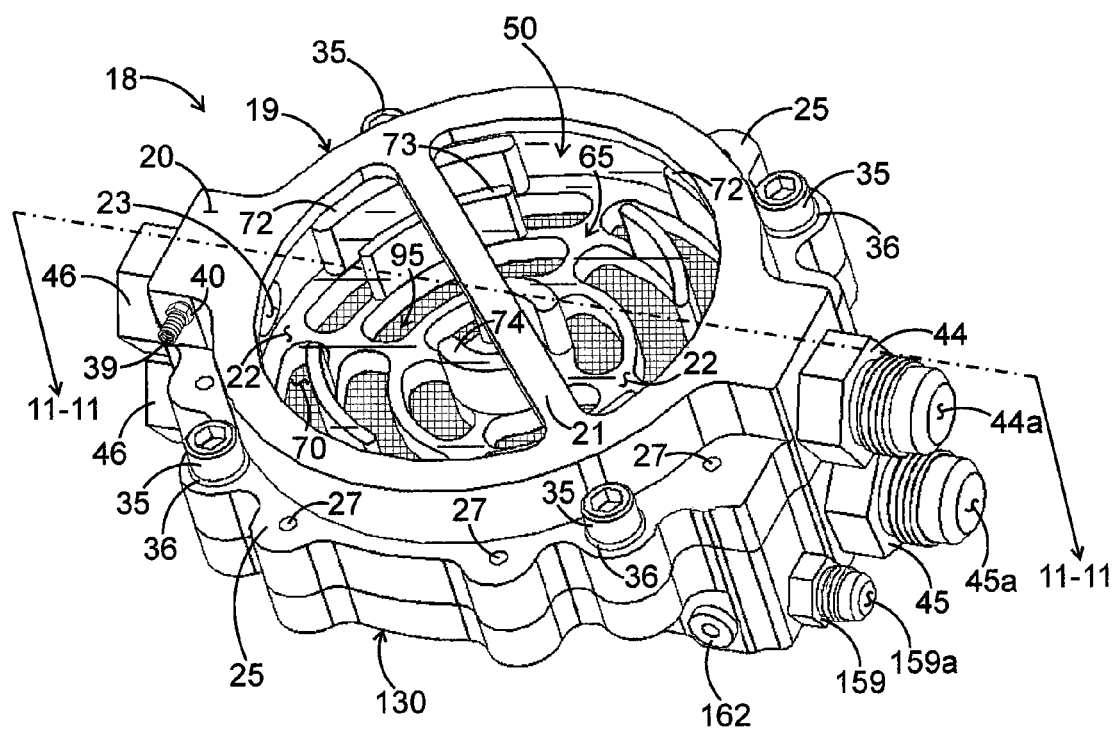
FIG. 1 is an isometric top, side and end view of the fluid filter assembly.

The readers of this document should understand that the embodiments described herein may rely on terminology used in any section of this document and other terms readily apparent from the drawings and the language common therefore as may be known in a particular art and such as known or indicated and provided by dictionaries. Dictionaries were used in the preparation of this document. Widely known and used in the preparation hereof are The American Heritage® Dictionary of the English Language, Fourth Edition. 2000. Print.; Webster's New International Dictionary. Second Edition. 1934. Print.; and the Compact Edition of the Oxford English Dictionary. 1971. Print., all of which are hereby incorporated by reference for interpretation of terms used herein and for application and use of words defined in such references to more adequately or aptly describe various features, aspects and concepts shown or otherwise described herein using more appropriate words having meanings applicable to such features, aspects and concepts.

This document is premised upon using one or more terms or features shown in one embodiment that may also apply to or be combined with other embodiments for similar structures, functions, features and aspects of the invention and provides additional embodiments of the invention. Wording used in the claims is also descriptive of the invention and the text of both claims and abstract are incorporated by reference into the description entirely. Terminology used with one, some or all embodiments may be used for describing and defining the technology and exclusive rights associated herewith.

The readers of this document should further understand that the embodiments described herein may rely on terminology and features used in any section or embodiment shown in this document and other terms readily apparent from the drawings and language common or proper therefore.

A fluid filter assembly with sight glass 18 provides a first upper housing 19, a sight glass 50, a sight glass retainer 65, a screen filter 95, a bypass valve 190, a low pressure drain valve 157 and a second lower housing 130.

The first upper housing 19 is preferably machined from billet aluminum, but may be formed or machined or molded or cast from other materials, and is generally circular in configuration having a top 20 and a bottom 33. An upper housing mounting flange 25 extends around circumference of the upper housing 19 and defines therein, a plurality of spacedly arrayed filter base mounting holes 26, and plural spacedly arrayed sight glass retainer mounting holes 27 for releasably securing the upper housing 19 to the sight glass retainer 65 and to the lower housing 130. The top 20 of the upper housing 19 defines a sight glass opening 22 with a cross piece 21 extending diametrically across the sight glass opening 22. The cross piece 21 prevents the sight glass 50 from "bowing" outwardly when under high pressure which may cause fluid leaks or sight glass fatigue or failure. High pressure applications may need an extra cross piece 21 which may form a cross brace (not shown) across the sight glass opening 22. The thickness of the cross piece 21 and the thickness of the sight glass may be adjusted to accommodate high pressures. At generally diametrically opposed positions, the upper housing 19 carries rectilinear enlargements that extend radially from the upper housing 19. Each rectilinear enlargement defines a radially aligned threaded fluid inlet port 24 communicating with an inner fluid inlet orifice 23 for flow of fluid into the assembly 18. Fluid inlet ports 24 are threaded to releasably accommodate a known plumbing fitting 44 that defines a medial channel 44a extending axially therethrough communicating with a source of fluid to be filtered (not shown), or alternatively to releasably carry a plug 46, if one fluid inlet port 24 is sealed.

Figure 4:
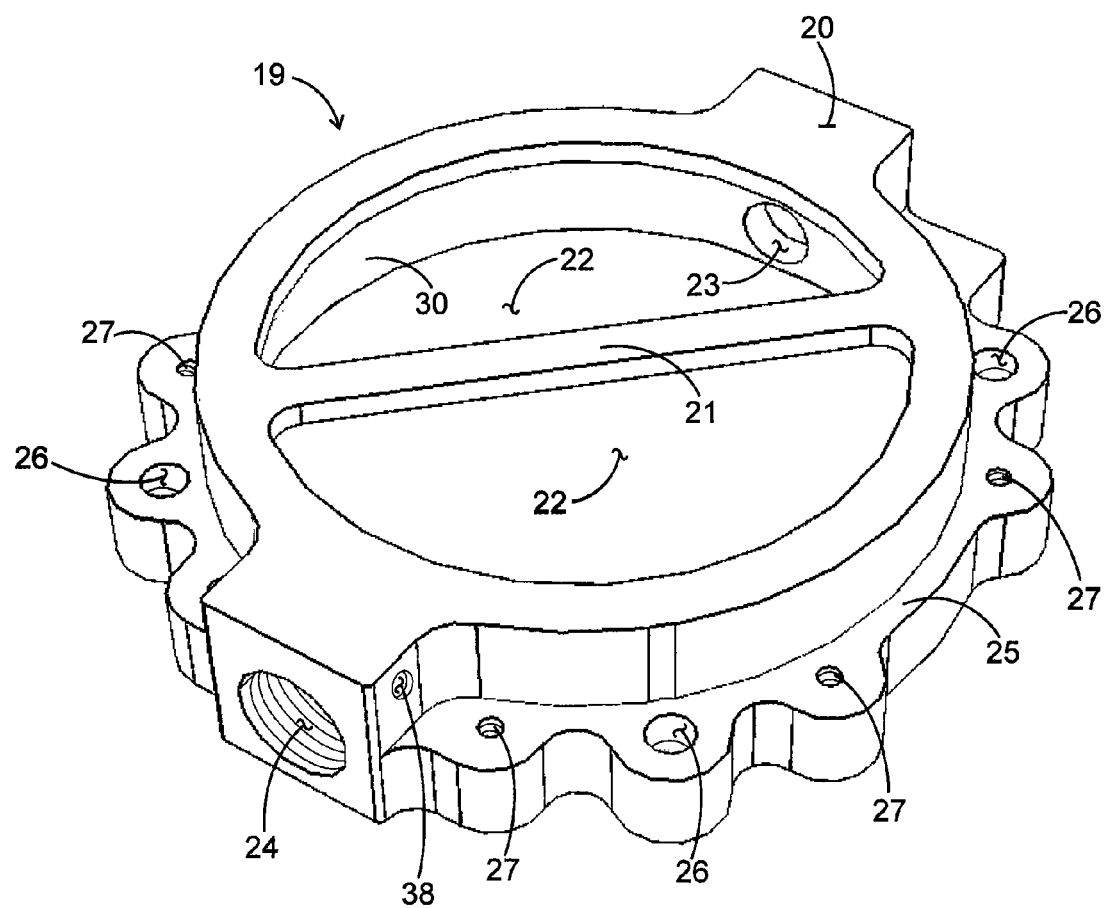
FIG. 4 is an isometric top, side and end view of the upper housing.
Figure 5:
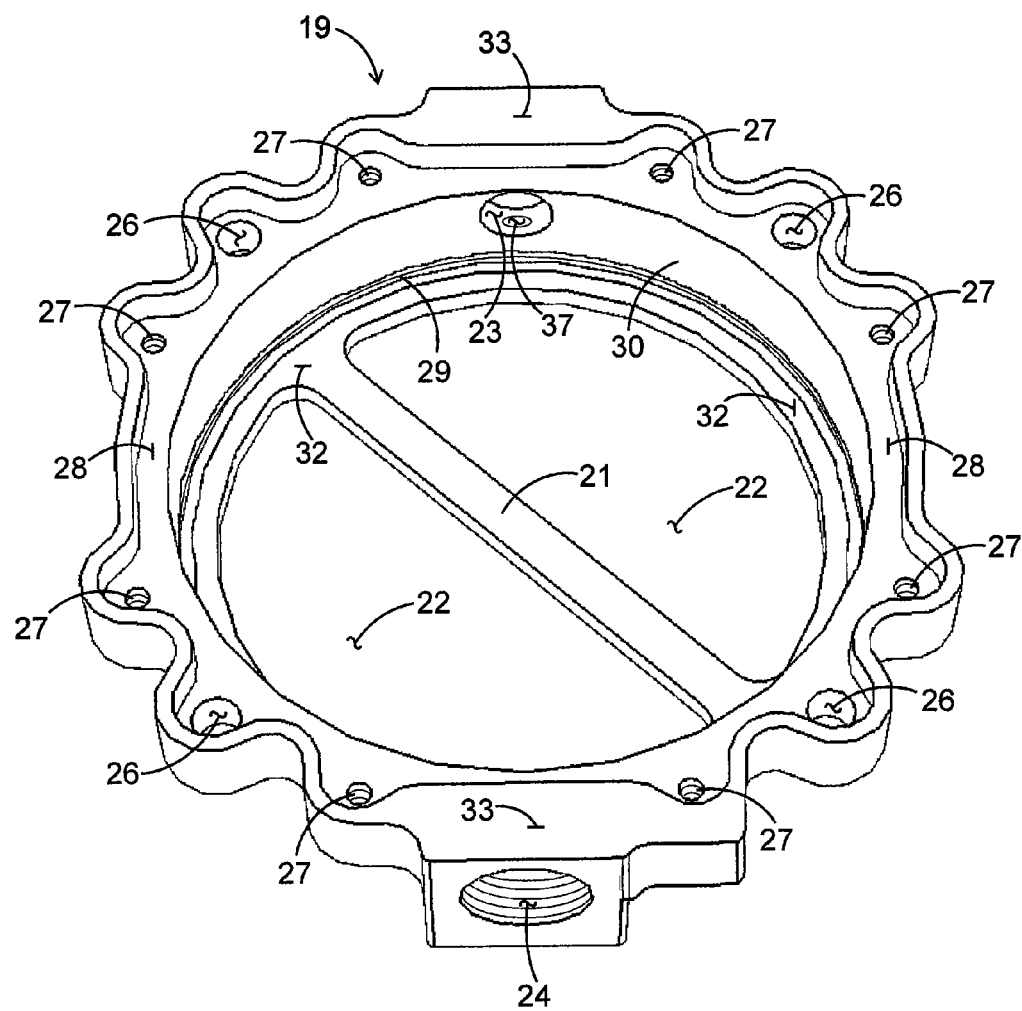
FIG. 5 is an isometric bottom and end view of the upper housing of FIG. 4.

As shown in FIG. 4, a pressurized air inlet 38 is defined in one of the rectilinear enlargements. The air pressure inlet 38 communicates with the interior of the assembly 18 for injection of pressurized air therein to purge fluids therefrom. FIG. 5 also shows air pressure passage 37 which is the inside end of the pressurized air inlet 38.

As shown in FIG. 5, the bottom 33 of the upper housing 19 defines a sight glass bore 30 to carry the sight glass 50 therein and an O-ring sealing surface 32 that extends radially inwardly from the sight glass bore 30 circumferential surface adjacent to the top 20 of the upper housing 19. The circumferential surface of the sight glass bore 30 defines an O-ring groove 29 to carry an O-ring 180 to provide a fluid tight seal between the circumferential surface of the sight glass 50 and the sight glass bore 30.

Figure 6:
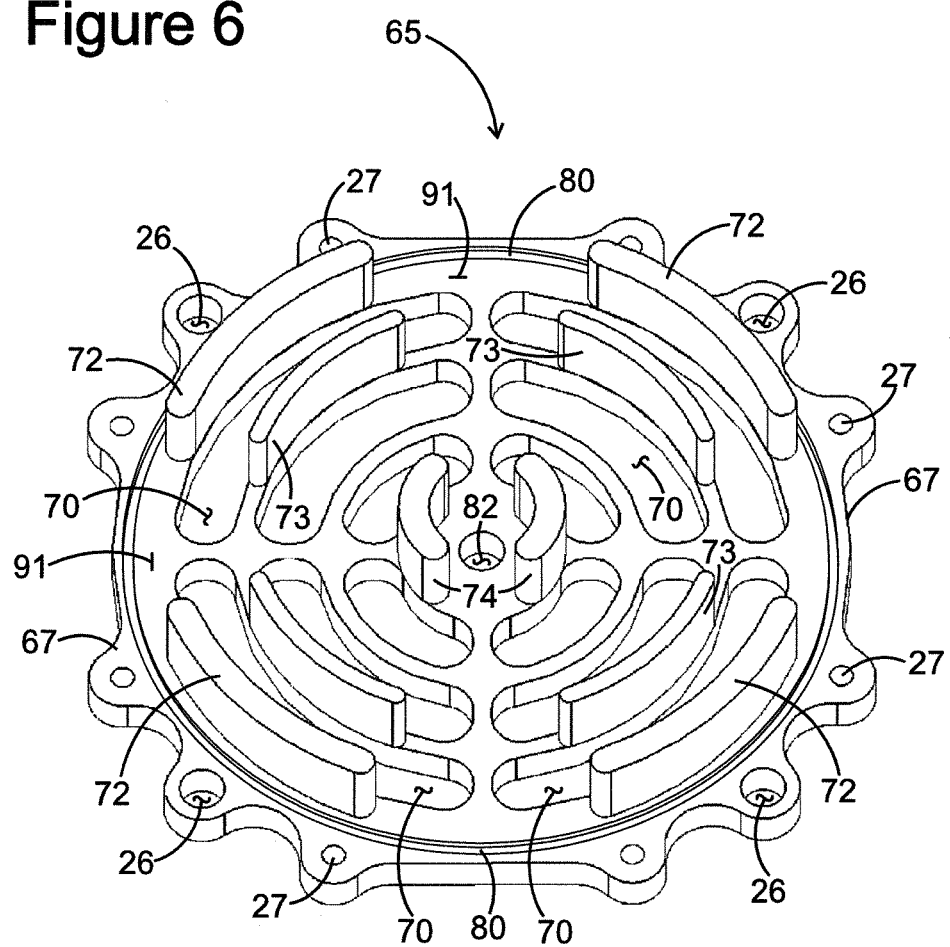
FIG. 6 is an isometric top and end view of the sight glass retainer.

The bottom 33 of the upper housing mounting flange 25 defines a recess 28 to carry the sight glass retainer 65. The recess 28 is machined deep enough so bottom portion 87 of the sight glass retainer 65 is co-planar with bottom 33 of the upper housing 19. The outer periphery of the recess 28 is similar to the configuration of the upper housing mounting flange 25 and also similar to the outer configuration of the sight glass retainer 65. (FIG. 6).

The sight glass 50 (FIG. 3) is circular in configuration having a top surface 58, a bottom surface (not shown) and a circumferential surface 52 extending thereabout. In the preferred embodiment, the sight glass 50 is formed of a material such as polycarbonate, acrylic, or glass such as, but not limited to borosilicate which are transparent, strong, and resistant to heat, chemicals, petroleum and additives frequently carried in fluids that might be filtered by the assembly 18. The sight glass 50 preferably has a scratch resistant and oil and chemical resistant coating (not shown) which helps keep the sight glass 50 transparent and clear regardless of the type of fluid being filtered. In the preferred embodiment the sight glass 50 is abrasion resistant polycarbonate.

An O-ring groove 54 is defined in the top surface 58 of the sight glass 50 radially inward to the circumferential surface 52 to carry an O-ring 179 therein to provide a fluid tight seal with the upper housing 19. Probably best shown in FIG. 12, the sight glass 50 has a beveled edge 56 at the corner where of the outer circumferential surface 52 and the top surface 58 meet. The beveled edge 56 is useful when inserting the sight glass 50 into the sight glass bore 30 so that the sight glass 50 does not "catch on" or damage O-ring 180 carried in O-ring groove 29 defined in the circumferential surface of the sight glass bore 30. The use of two O-rings 179, 180 to seal the sight glass 50 into the upper housing 19 allows the assembly 18 to withstand high pressures of fluids being filtered therethrough without leaking. The sight glass 50 is positionally maintained within the sight glass bore 30 of the upper housing 19 by the sight glass retainer 65.

Figure 12:
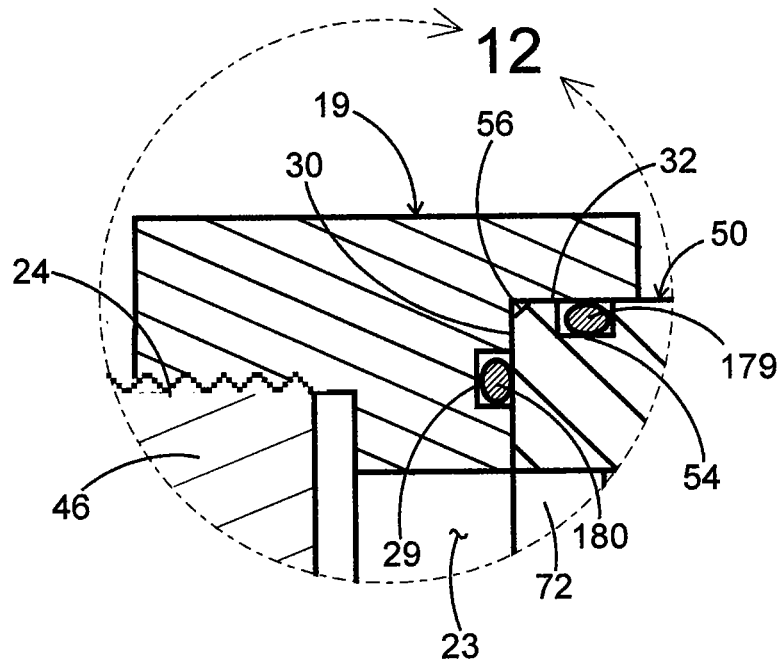
FIG. 12 is an enlarged view of the sealing elements of the sight glass taken from FIG. 11.

Sight glass retainer 65 (FIGS. 6 and 7), is preferably machined from billet aluminum, but may be formed or machined from other materials, and is generally circular in configuration and defines a plurality of spacedly arrayed filter base mounting holes 26, and sight glass retainer mounting holes 27 in the sight glass retainer mounting flange 67 extending around periphery of the sight glass retainer 65. The sight glass retainer 65 has a top 91 and an opposing bottom 87 and defines a plurality of spacedly arrayed arcuate openings 70 that communicate from the top 91 to the bottom 87. The top 91 of the sight glass retainer 65 also carries a plurality of arcuate sight glass supports 72, 73, 74 that are spacedly arrayed about the top 91 and adjacent to the arcuate openings 70. The sight glass supports 72, 73, 74 extend vertically perpendicularly from the top 91 and are preferably generally equally spaced from one another. The sight glass supports 72, 73, 74 frictionally communicate with a bottom surface (not shown) of the sight glass 50 and force the sight glass 50 into the sight glass bore 30 defined in the upper housing 19 and compress the O-ring 179 to seal the sight glass 50 into to the upper housing 19 and provide a fluid tight seal therebetween. (FIG. 12). The arcuate openings 70 allow fluids being filtered to pass therethrough for filtering by the screen filter 95 thereunder.

Fluid deflectors 73 are also carried on the top 91 of the sight glass retainer 65 and are spacedly arrayed thereon about the arcuate openings 70. The fluid deflectors 73 disburse the fluid about the sight glass retainer 65 and into a plurality of the arcuate openings 70. Further, the fluid deflectors 73 operate to cool and distribute the fluid being filtered and further distribute any particulates and contaminants that might be carried within the fluid to the various arcuate openings 70.

Bypass valve feed hole 82 is defined in the center of the sight glass retainer 65 and communicates with the bypass valve 190 carried within the lower housing 130.

O-ring groove 80 is defined in the top 91 of the sight glass retainer 65 radially outwardly from sight glass supports 72. O-ring 181 is carried in the O-ring groove 80 to provide a fluid tight seal between the top 91 of the sight glass retainer 65 and the recess 28 for the sight glass retainer 65 defined in the bottom 33 of the upper housing mounting flange 25.

Figure 7:
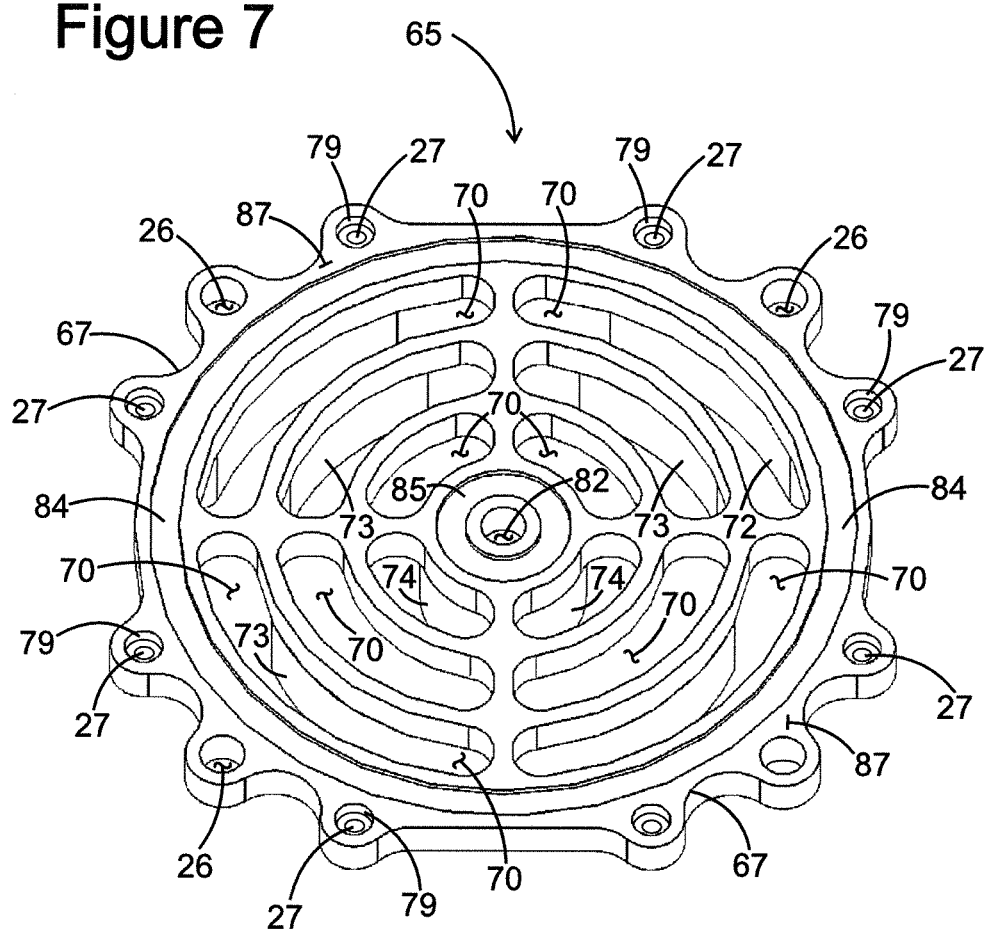
FIG. 7 is an isometric bottom and end view of the sight glass retainer of FIG. 6.

The bottom 87 (FIG. 7) of the sight glass retainer 65 has the same general configuration as the top 91 but without the fluid deflectors 73 and without the sight glass supports 72. A screen filter element outer seal seat 84 is defined in the bottom 87 extending about the periphery radially inward from the sight glass retainer mounting flange 67. A screen filter element inner seal seat 85 is defined in the bottom 87 radially outward from the bypass valve feed hole 82. The sight glass retainer bottom outer seal seat 84 and the sight glass retainer bottom inner seal seat 85 are configured to communicate with and carry therein inner and outer seals 100, 98, respectively, of the screen filter 95. As can be seen in FIG. 7, select sight glass retainer mounting holes 27 defined in the sight glass retainer mounting flange 67 are counter sunk 79 to accommodate head portions (not shown) of fasteners 90 (FIG. 3) that extend through the sight glass retainer mounting holes 27 and threadably engage with threaded mounting holes 27 defined in the upper housing 19. The countersinking 79 of the sight glass retainer mounting holes 27 prevents the head portions (not shown) of the fasteners 90 from interfering with the sealing of the upper housing 19 with the lower housing 130.

The screen filter 95 (FIG. 3) is circular in configuration and is preferably comprised of a stainless steel wire screen mesh 97 that is available in a variety of mesh sizes capable of filtering macro-particles to micro-particles.

Figure 13:
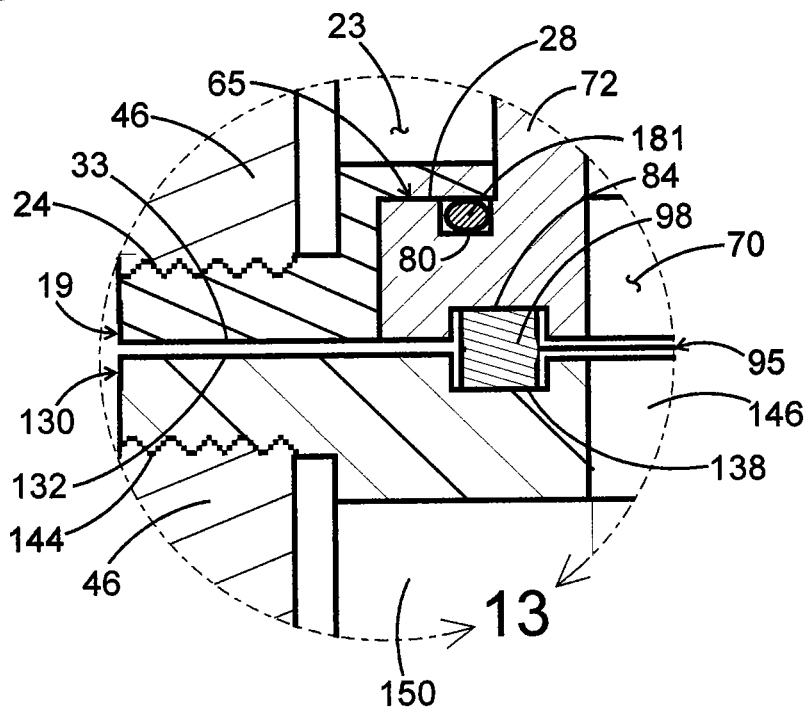
FIG. 13 is an enlarged view of the sealing elements of the filter element taken from FIG. 11.

An outer screen filter seal 98 is carried at the outer periphery of the screen filter 95 and extends circumferentially thereabout. Similarly, an inner screen filter seal 100 extends about circumference of bypass hole 102 defined in a center portion of the screen filter 95. The inner screen filter seal 100 and the outer screen filter seal 98 have similar configurations and, as shown in FIG. 13, the outer screen filter seal 98 is compressed into the outer screen filter element seal seat 84 defined in the bottom 87 of the sight glass retainer 65 and in the outer screen filter element seal seat 138 defined in a top 132 of the lower housing 130.

The assembled upper portion of the assembly 18, which compromises the upper housing 19, the sight glass 50 and the sight glass retainer 65 need not be disassembled for any reason other than the replacement of the O-rings 179, 180, if necessary.

Figure 8:
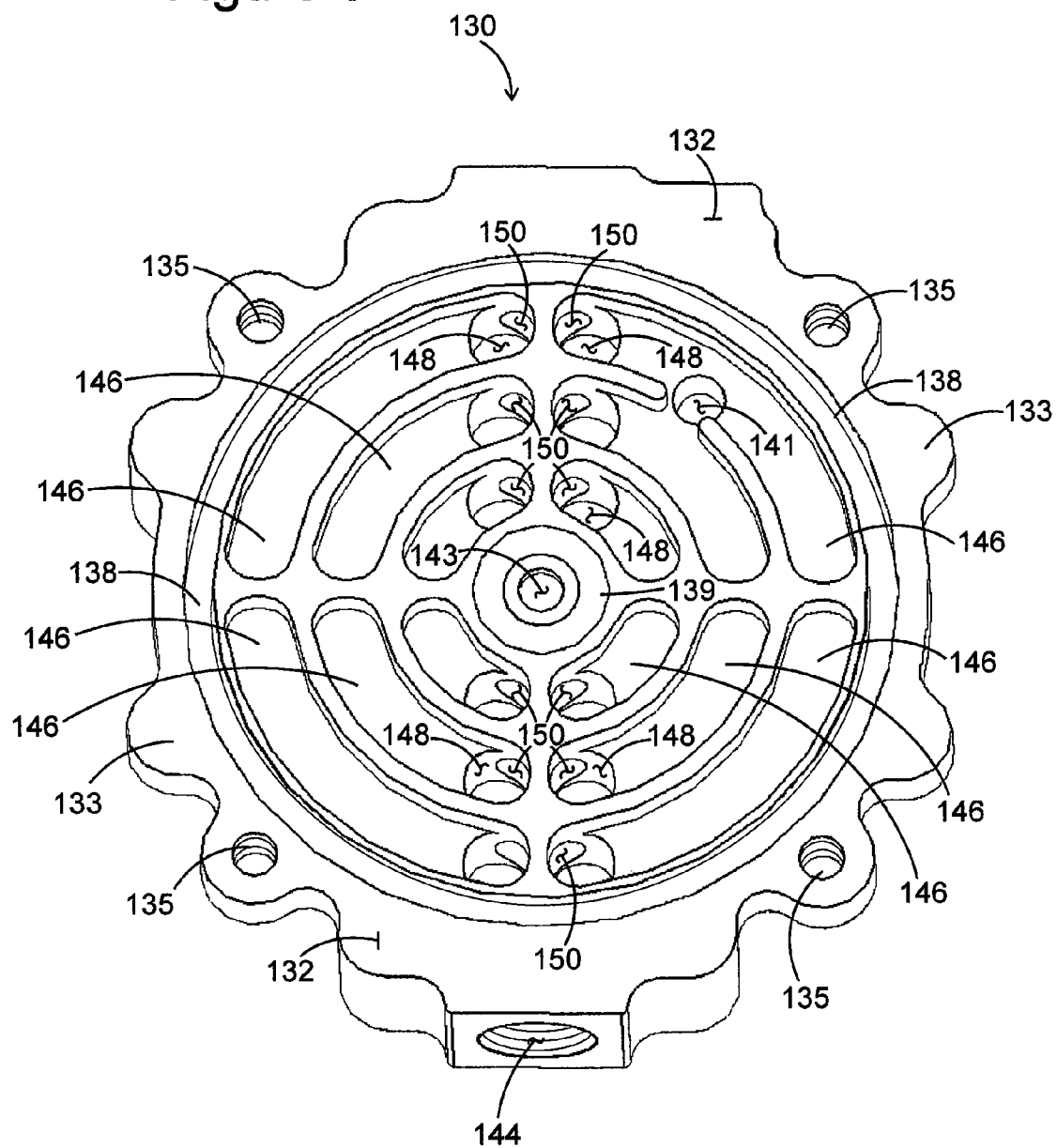
FIG. 8 is an isometric top and end view of the lower housing.

The second lower housing 130 (FIGS. 8, 9, and 10) is preferably machined from billet aluminum, but may be formed or machined or molded or cast from other materials, and has a top 132, an opposing bottom 172, and has an outlet channel housing 174 carried on the bottom 172 extending diametrically thereacross.

The top 132 of the lower housing 130 is similar in configuration to the bottom 87 of the sight glass retainer 65 and is complementary thereto. The top 132 defines plural arcuate recesses 146 that align with the plural arcuate openings 70 defined in the sight glass retainer 65. Each of the arcuate recesses 146 defines a fluid passage 148 that communicates with an outlet passage 150 defined in the outlet channel housing 174. The outlet passage 150 extends diametrically across the lower housing 130 and defines a fluid outlet port 144 at each end portion. Each fluid outlet port 144 is threaded to releasably engage with a known plumbing fitting 44, which defines a medial channel 44a extending axially therethrough, or a known plug 46 (FIG. 10) if a fluid outlet port 144 is to be sealed.

Drain valve pressure passage 141 (FIG. 8) is defined in at least one of the arcuate recesses 146. The drain valve pressure passage 141 communicates with the low-pressure drain valve 157.

Outer seal seat 138 and inner seal seat 139 are defined in the top 132 of the lower housing 130 at positions to receive the inner screen filter seal 100 and the outer screen filter seal 98 of the screen filter 95.

Figure 2:
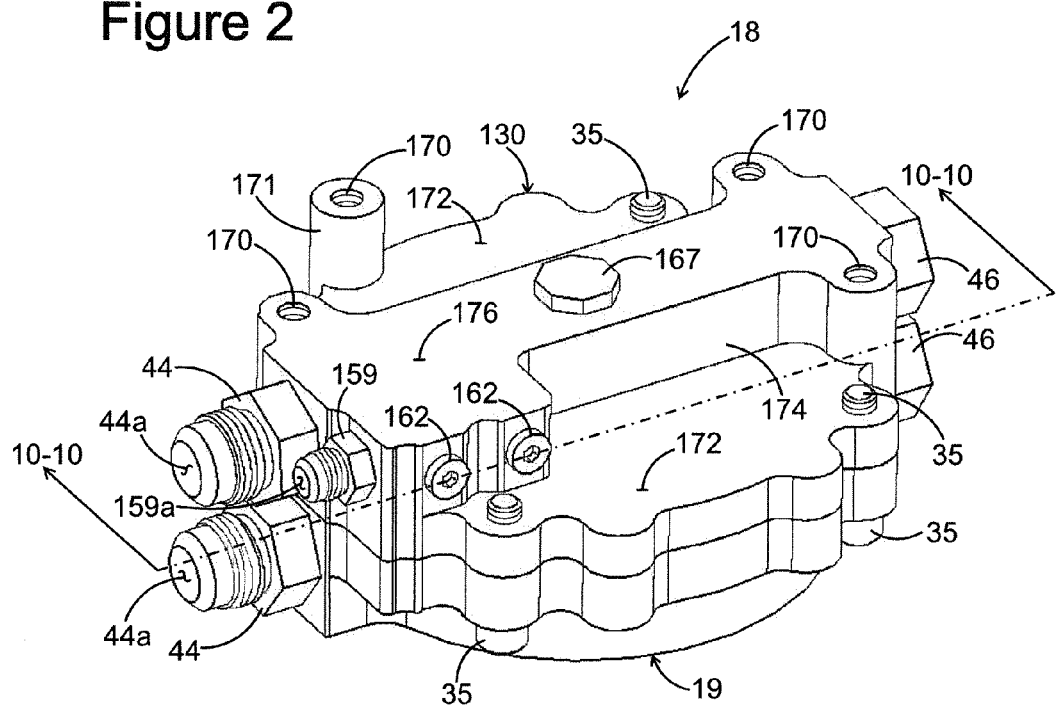
FIG. 2 is an isometric bottom, side and end view the fluid filter assembly of FIG. 1.

Mounting flange 133 extends around the periphery of the lower housing 130 and defines four spacedly arrayed mounting holes 135 for threaded top housing fasteners 35 and washers 36 to releasably secure the lower housing 130 to the upper housing 19. The top housing fasteners 35 pass through the upper housing 19 filter base mounting holes 26 and through the filter base mounting holes 26 defined in the sight window retainer 65 and thereafter engage with the threaded mounting holes 135 defined in the lower housing 130. As can be seen in FIGS. 1 and 2, it may be necessary to form of a slight concave depression in the outer circumferential surface of the upper housing 19 radially adjacent each filter base mounting hole 26 to accommodate the head portion of the top housing fasteners 35 and the washer 36.

Figure 11:
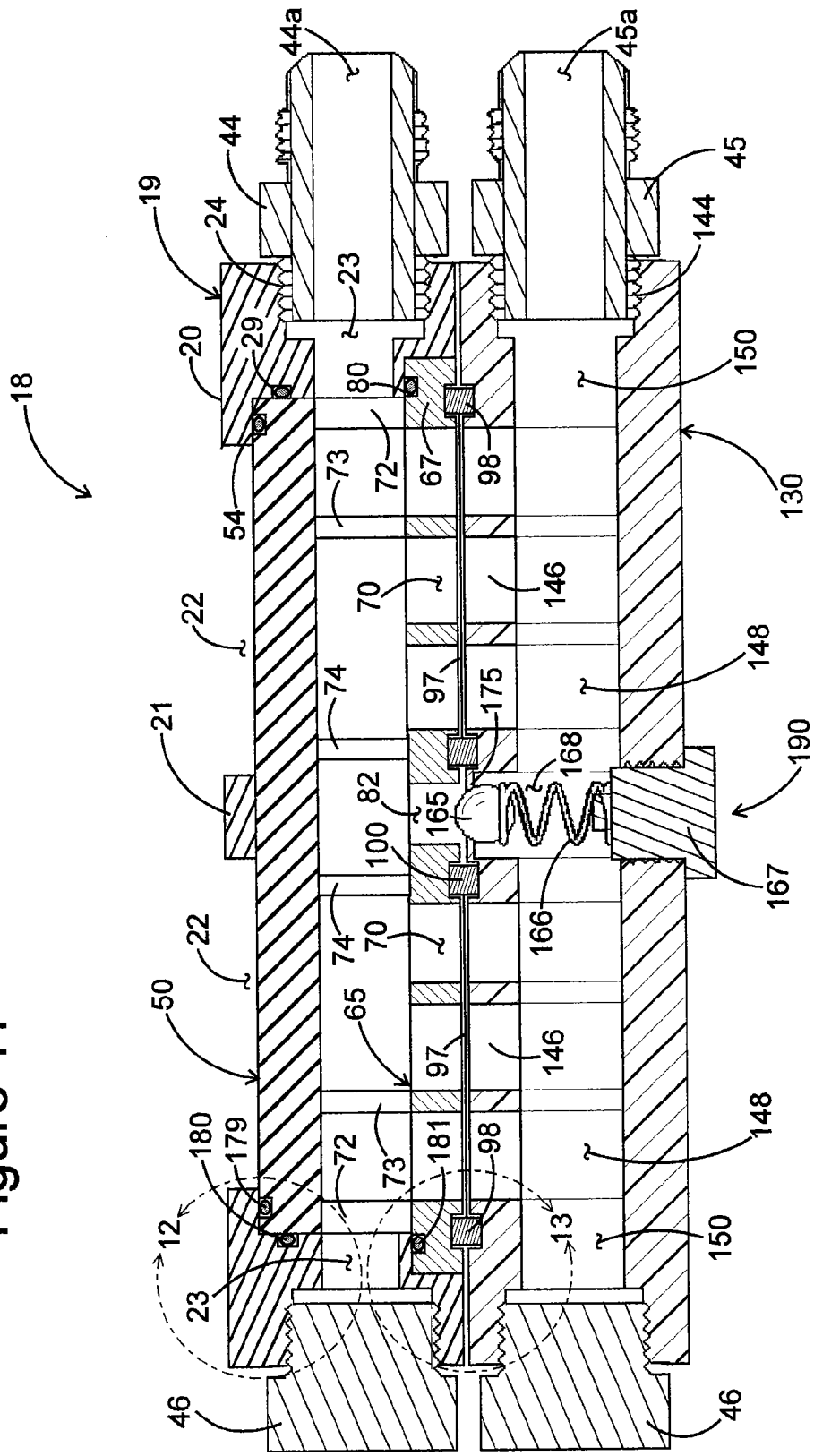
FIG. 11 is a cross section view of the filter assembly, taken on line 11-11 of FIG. 1.

As shown in FIG. 11, when the assembled upper housing 19 is secured to the lower housing 130 by the plural top housing fasteners 35, the outer screen filter seal 98 and the inner screen filter seal 100 of the screen filter 95 are compressed in the aligned outer seal seats 84, 138 (FIG. 13) and the aligned inner seals seats 85, 139 to provide a fluid tight seal between the upper housing 19, the sight glass retainer 65, the screen filter 95 and the lower housing 130 that will not leak even when exposed to high working pressures up to approximately 350 psi. The compression of the screen filter seals 98, 100 forces any fluid entering the assembly through fluid inlet ports 24 to pass through the screen filter 95 in order to exit the assembly 18 through the fluid outlet ports 144.

FIG. 2 shows a bottom view of the assembled fluid filter assembly 18 having four spacedly arrayed threaded mounting holes 170. Three of the mounting holes 170 are machined and into a bottom surface 176 of the outlet passage housing 174 while a fourth mounting hole 170 is defined in an end portion of a mounting boss 171 so that all of the mounting holes 170 are at the same vertical level allowing the assembly 18 to be mounted in a variety of orientations to accommodate a variety of locations and applications. In the preferred embodiment, the assembly 18 is mounted horizontally with the sight glass 50 facing upwardly. It is anticipated that only two of the mounting holes 170 are necessarily required to mount the assembly 18 for use.

Figure 10:
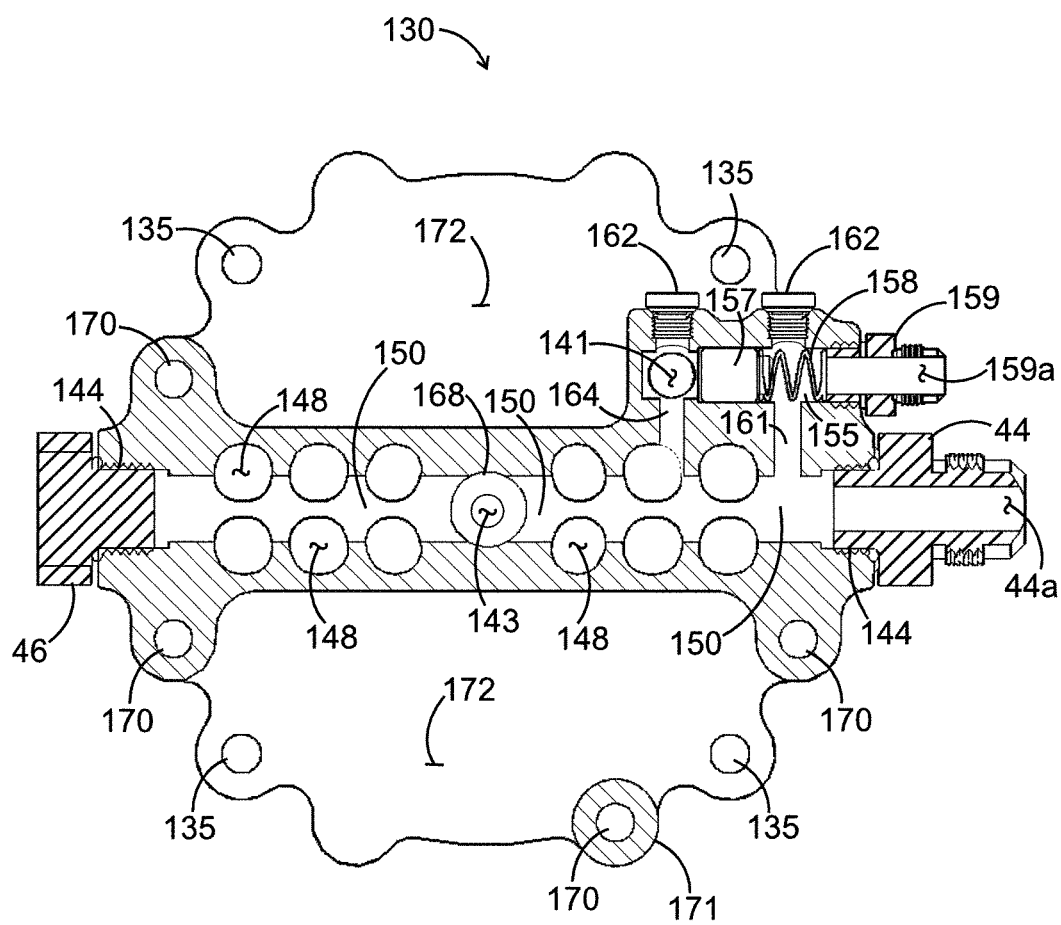
FIG. 10 is a partial cross-section of the of the lower housing taken on line 10-10 of FIG. 2.
Figure 14:
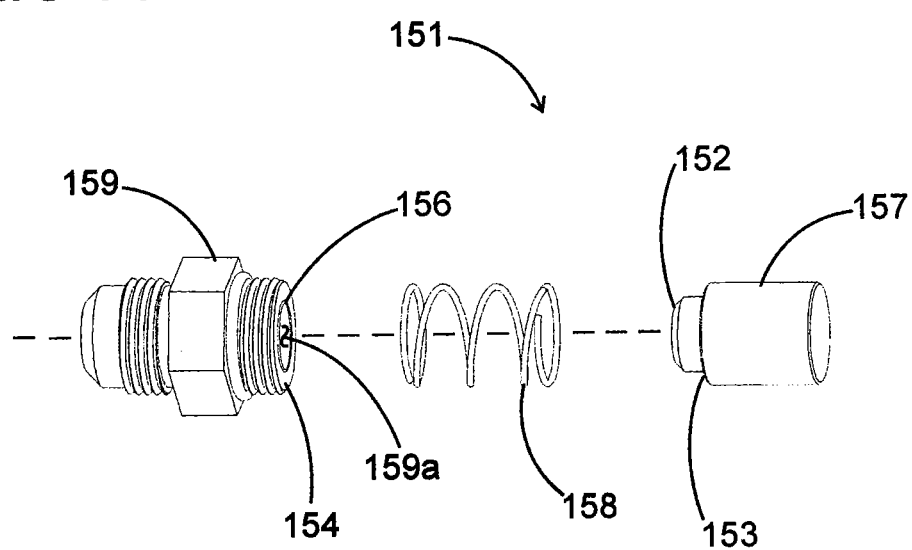
FIG. 14 is an enlarged exploded view of the low pressure drain valve assembly.

The outlet passage housing 174 contains the low-pressure drain valve assembly 151 (FIGS. 14, 10). The low-pressure drain valve assembly 151 generally comprises drain valve channel 155 defined in the outlet passage housing 174, drain valve 157, drain valve spring 158 and a retainer fitting 159. (FIG. 14).

The drain valve 157 has a drain valve spring seat 153 portion and a beveled sealing seat 152 to form a fluid tight seal with the retainer fitting 159. The drain valve spring 158 has a first end portion that fictionally communicates with the drain valve spring seat 153 on the drain valve 157 and a second end portion that frictionally communicates with a retainer fitting spring seat 154 of the retainer fitting 159. As shown in FIG. 14, the retainer fitting 159 defines a medial channel 159a extending axially therethrough so that fluid may pass therethrough.

The drain valve spring 158 biases the drain valve 157 to a position within the drain valve channel 155 so that the drain passage 161 is not obstructed and fluid may pass therethrough and into medial channel 159a of the retainer fitting 159 to exit the assembly 18 to a fluid reservoir such as an oil pan. (Not shown). It is preferable that the drain valve spring 158 carry approximately 10 pounds per square inch (10 psi) of pressure to positionally maintain the drain valve 157 against a drain valve seat (not shown) within the drain valve channel 155 when there is no fluid pressure within the assembly 18. For example, when an internal combustion motor (not shown) to which the assembly 18 is attached is "turned off" the fluid pressure will drop to zero and the drain valve spring 158 would have sufficient strength to move the drain valve 157 to a biased position within the drain valve channel 155 allowing the drain passage 161 to open and remain unobstructed allowing fluid to flow through the medial channel 159a of the retainer fitting 159.

As shown in FIG. 10, when the drain valve 157 is positioned against a sealing seat (not shown) within the drain valve channel 155, fluid may freely pass from the outlet passage 150 through fluid drain passage 161, and thereafter to fluid reservoir (not shown). Outer opening of the drain passage 161 opposite the outlet passage 150 is preferably sealed with a threaded plug 162 which forces the fluid to pass through the medial channel 159a defined in the retainer fitting 159. After the fluid passes through the retainer fitting medial channel 159a, the fluid may flow back to a fluid reservoir (not shown).

As shown in FIG. 10, pressure port passage 164 is defined in the outlet passage housing 174 and transects the drain valve pressure passage 141 and communicates with the outlet passage 150. The pressure port passage 164 is threaded at its outer opening (FIG. 9) to receive a threaded plug 162. If necessary, the pressure port passage 164 may be interconnected with a known pressure gauge (not shown), or other known device to determine fluid pressures within the assembly 18. The pressure port passage 164 and the drain valve pressure passage 141 both supply fluid pressure to an end portion of the drain valve 157 opposite the drain valve spring 158. When the assembly 18 is pressurized, such as when an internal combustion motor is started, fluid pressure passing through the drain valve pressure passage 141 and the pressure port passage 164 exert pressure on the drain valve 157 causing it to move axially within the drain valve channel 155 compressing the drain valve spring 158 and overcoming the spring biasing. The movement of the drain valve 157 and compression of the drain valve spring 158 causes the sealing seat 152 to frictionally engage with the valve seat 156 of the retainer fitting 159 which seals the fluid drain port 161 and prevents fluid from flowing through the medial channel 159a of the retainer fitting 159.

The low-pressure drain valve assembly 151 allows the assembly 18 to drain of fluids when not under pressure. The low pressure drain valve assembly 151 only closes when pressure exists inside the assembly. Because the draining action of the low pressure drain valve assembly 151 is gravitational, those familiar in the art will readily recognize that the assembly 18 must be positioned vertically above the fluid reservoir into which the fluid will flow.

Figure 3:
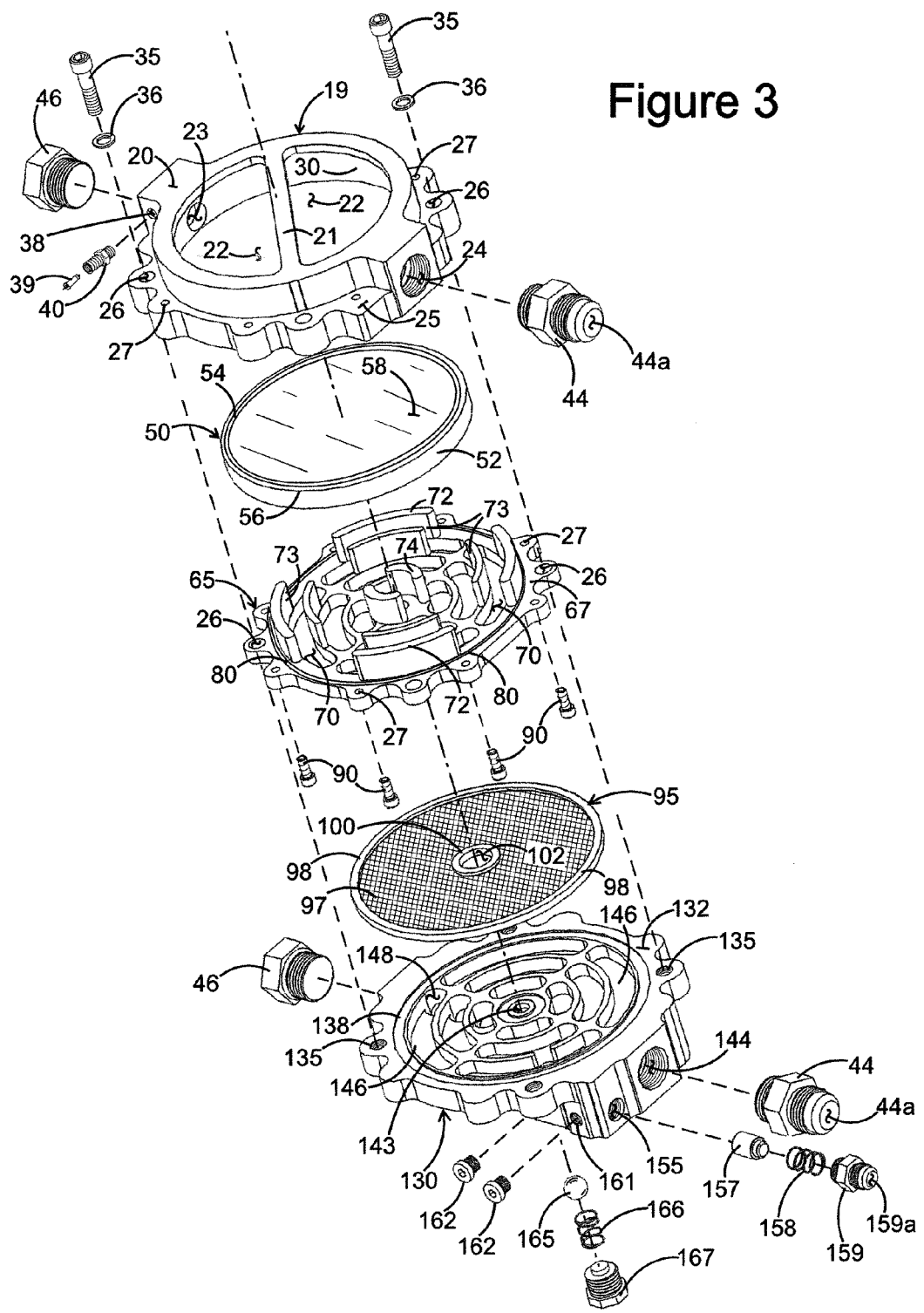
FIG. 3 is an exploded isometric view of the fluid filter assembly of FIG. 1.

As shown in FIG. 3, a one-way air valve housing 40 is threadably carried within the pressured air inlet 38 defined in the upper housing 19. The air valve housing 40 defines a threaded medial channel extending therethrough (not shown) and carries within the medial channel (not shown) an air valve 39 so that pressurized air may be injected into the assembly 18 below the sight glass 50 and above the screen filter 95. The injection of pressurized air into the assembly 18 forces the fluids through the screen filter 95 and through the fluid outlet ports 144 defined in the lower housing 130. Forcing the fluids through the screen filter 95 will leave any particulates, contaminants and the like that are larger than the screen openings (not shown) captured on the screen filter 95 so that the particulates and contaminants may be viewed by a user examining the screen filter 95 through the sight glass 50.

The input air valve 39 is a one-way valve so fluid, and pressure cannot leak therethrough in the opposite direction. The air valve housing 40 and air valve 39 are similar in construction to an air valve carried on an automobile tire and as such, standard air valve fittings, may be used to supply pressurized air to the assembly 18. The air valve 39 is particularly important if chemical additives (not shown) have been added to the fluid being filtered which may cause viscosity to increase and cause the fluid to "gum up" on the screen filter 95 and impede draining. Addition of air pressure to the assembly 18 "a head of" the screen filter 95 forces such high viscosity fluids through the screen filter 95 to reveal the particulates and contaminants captured on/by the screen filter 95.

Figure 9:
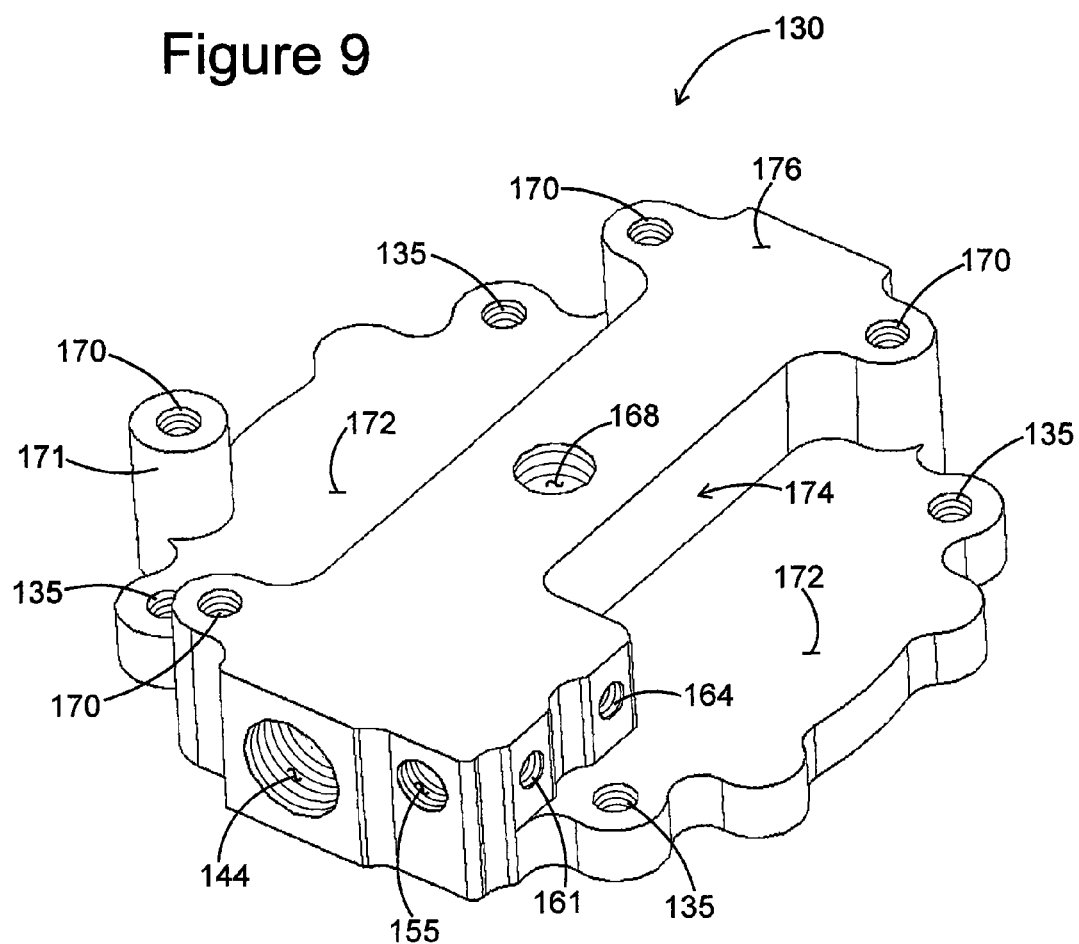
FIG. 9 is an isometric bottom, side and end view of the lower housing.

As shown in FIG. 11, the bypass valve 190 is carried within the lower housing 130 and is comprised of a stainless steel ball 165 that functions as the valve, a bypass valve spring 166 that exerts continuous pressure on the steel ball 165 and a bypass valve spring seat plug 167 that threadably engages in a threaded bypass valve hole 168 defined in the outlet passage housing 174. (FIG. 9). The steel ball 165 "seats" in a bypass valve seat 175 machined into the lower housing 130. The bypass valve seat 175 is diametrically smaller than the diameter of the steel ball 165 so that pressure exerted by the bypass valve spring 166 forces the steel ball 165 against the bypass valve seat 175 to prevent fluids from flowing therebetween.

The bypass valve spring 166 transects the outlet channel 150 defined in the outlet passage housing 174. The strength of the bypass valve spring 166 may be altered by changing the bypass valve spring 166 as desired by a user to exert more or less pressure on the steel ball bearing 165 which responsively adjusts the amount of pressure that must exist within the assembly 18 and above the screen filter 95 before the pressure within the assembly 18 above the screen filter 95 is sufficient to force the ball bearing 165 away from the bypass valve seat 175 to allow the fluid to pass therebetween through the bypass passage 143, rather than forcing the fluid to pass through the screen filter 95.

The bypass valve 190 is a safety feature for the assembly 18 and is only actuated when the screen filter 95 becomes sufficiently plugged to no longer allow sufficient fluid to pass through the screen filter 95. When that event occurs, the pressure within the assembly 18 in the volume between the sight glass 50 and the screen filter 95 will rise to a sufficient level to force the steel ball 165 away from the bypass valve seat 175 so that the fluid may pass from above the screen filter 95 and directly into the outlet passage 150 without being filtered. Although the passage of fluid through the bypass valve 190 allows contaminated and dirty fluids to pass through the assembly 18, the allowance of the fluid to continue flowing is more likely to prevent a catastrophic failure that would be caused by a complete absence of fluid for lubrication.

The pressure exerted by the bypass valve spring 166 is known as "seat pressure" and is preferably approximately ten percent (10%) higher than the normal operating pressure of the fluid to be filtered by the assembly 18. When the fluid pressure above the screen filter 95 exceeds the seat pressure by approximately ten percent (10%) causing a pressure differential within the filter assembly 18 between above the screen filter 95 and below the screen filter 95, the pressure differential will force the steel ball 165 downwardly away from the bypass valve seat 175 by compressing the bypass valve spring 166 allowing the fluid to flow around and about the steel ball 165 rather than forcing the fluid to pass through the filter screen 95.

Figure 15:
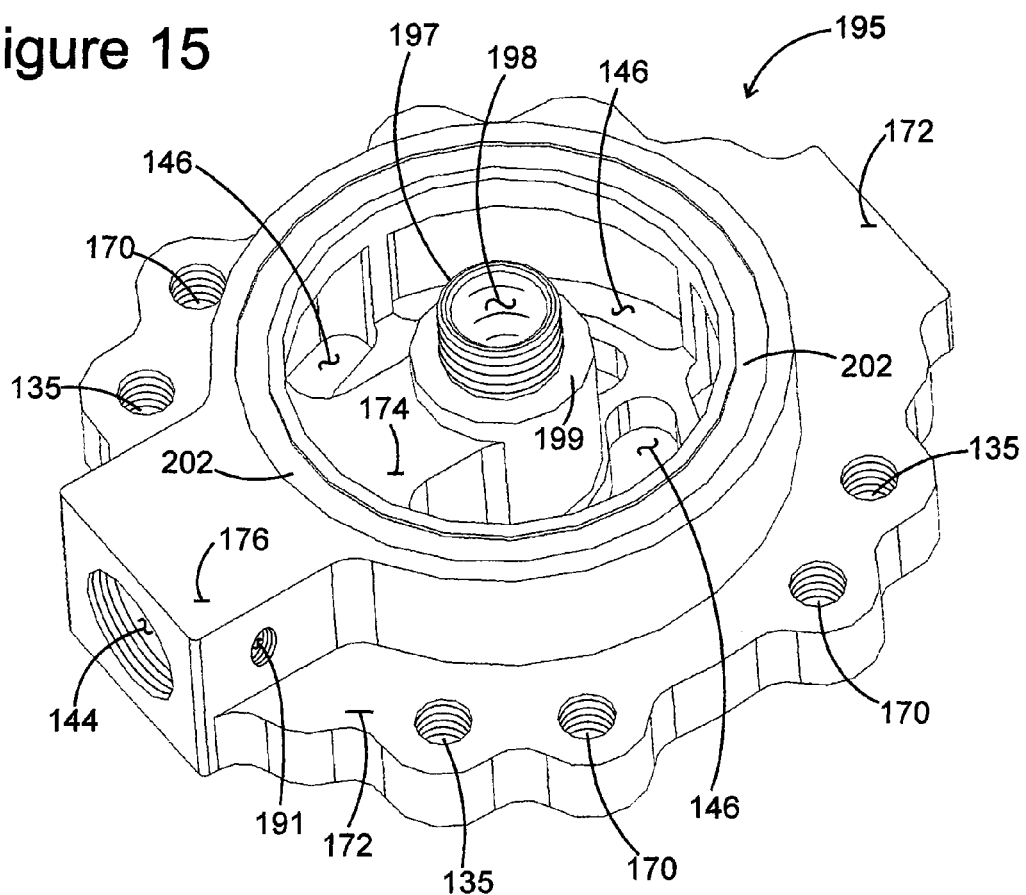
FIG. 15 is an isometric bottom, side and end view of second embodiment of the lower housing that releasably accepts a disposable filter, such as an oil filter or a water separator.
Figure 16:
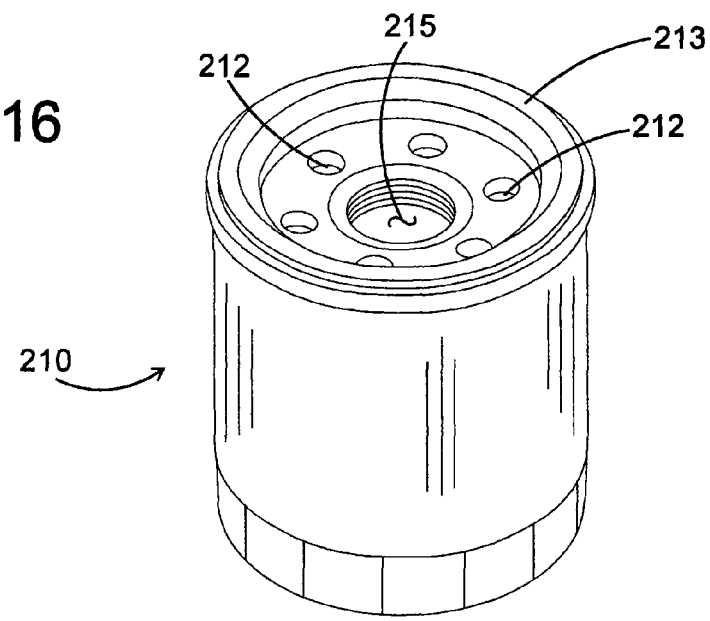
FIG. 16 is an isometric top and side view of a prior art disposable fluid filter of the type that may be releasable attached to the lower housing of FIG. 15.

In a second embodiment, as shown in FIG. 15, the lower housing 195 is modified to releasably carry a removable disposable fluid filter 210 such as a disposable oil filter, a disposable water filter, a disposable water separator, a disposable fuel filter and the like. The second embodiment lower housing 195 has a top surface (not shown) that is identical to the top 132 of the lower housing 130 shown in FIG. 8. The bottom of the second embodiment of the lower housing 195 is configured so a removable disposable fluid filter 210 or water separator may be threadably engaged thereto on a threaded nipple 197. The threaded nipple 197 is carried by a threaded nipple housing 199 and defines a feed channel 198 extending therethrough. The feed channel 198 communicates with the outlet passage 150 and at least one fluid outlet port 144. A seal receiving groove 202 is defined in the bottom of the second embodiment lower housing 195 radially spaced apart from the threaded nipple 197 to carry and engage with a rubber seal 213 of the removable disposable fluid filter 210. In this second embodiment, fluid passes into the upper housing 19 then through the screen filter 95, then into at least one fluid channel 146 defined in the lower housing 195. The fluid then flows into the removable disposable fluid filter 210 inlet openings 212. (FIG. 16). After passing through internal filter elements (not shown) of the removable disposable fluid filter 210, the fluid flows outwardly through fluid outlet 215 which communicates with feed channel 198 defined by threaded nipple 197. The filtered fluid then passes back into the lower housing 195 through the outlet passage (not shown) and though the at least one fluid outlet port 144.

Lower housing 195 of the second embodiment defines a pressure port passage 191 which is threaded at its outer opening to receive a threaded plug (not shown). If desired, the pressure port passage 191 may be interconnected with a known pressure gauge (not shown), or other known device to determine fluid pressures within the assembly.

Having described the structure of the fluid filter with sight glass its operation may be understood.

The assembly 18 is plumbed into the fluidic system (preferably a lubrication system, of an apparatus such as an internal combustion engine) in a manner known to those familiar with the art generally by mounting the assembly at a desirable location with fasteners (not shown) that interconnect with the mounting holes 170 defined in the lower housing 130 or 195.

A first fluid plumbing line, such as a pressurized oil feed line/hose (not shown) is interconnected to at least one of the fluid inlet port fittings 44 to feed dirty fluid into the assembly 18. Similarly, a second fluid plumbing line (not shown) is interconnected to at least one of the fluid outlet port fittings 45 to supply filtered fluid back to the internal combustion engine.

Fluid enters the assembly 18 through the fluid inlet ports 24 and flows around and about the fluid deflectors 73 and the sight glass supports 72 and then into the arcuate openings 70 defined in the sight glass retainer 65. The fluid flows through the screen filter 95 and into the arcuate recesses 146 defined in the lower housing 130 or 195. After the fluid passes into the arcuate recesses 146, the fluid passes thorough the fluid passages 148 and into the outlet passage 150 for passage through the at least one outlet port 144 and back into the fluid system or internal combustion engine.

The above description of the invention has set out various features, functions, methods and other aspects of the invention. This has been done with regard to the currently preferred embodiments thereof. Time and further development may change the manner in which the various aspects are implemented. Such aspects may further be added to by the language of the claims which are incorporated by reference hereinto as originally filed. The scope of protection accorded the invention, as defined by the claims, is not intended to be necessarily limited to the specific sizes, shapes, features or other aspects of the currently preferred embodiment shown and described. The claimed invention may be implemented or embodied in other forms still being within the concepts shown, described and claimed herein. Also included are equivalents of the invention which can be made without departing from the scope or concepts properly protected hereby.

The foregoing description of the invention is necessarily of a detailed nature so that a specific embodiment of a best mode may be set forth as is required, but it is to be understood that various modifications of details, sizes, and rearrangement, substitution and multiplication of the parts may be resorted to without departing from its spirit, essence or scope.

Having thusly described the invention, what I desire to protect by Utility Letters Patent and what I claim is:

1. A fluid filter assembly with sight glass for opaque viscous fluids comprising in combination:
    a first housing having a first top and an opposing spaced apart first bottom,
        a sight glass opening defined in the first top of the first housing communicating with a sight glass bore defined in the first bottom, and
        plural fluid inlet ports defined in the first housing communicating between an outer surface of the first housing and an interior of the first housing for flow of opaque viscous fluids into the interior of the first housing;
    a transparent sight glass carried within the sight glass bore of the first housing for providing user visibility into the interior of the first housing, the transparent sight glass having a planar top surface and an opposing planar bottom surface;
    a sight glass retainer carried within the first housing vertically below the sight glass to positionally maintain the sight glass within the sight glass bore;
    a second housing having a second top and an opposing spaced apart second bottom,
        plural arcuate recesses defined in the second top of the second housing, each of the plural arcuate recesses communicating with an outlet passage, the outlet passage having a fluid outlet port communicating with an outer surface of the second housing to allow the viscous fluid to flow out of the second housing;
    a mesh screen filter carried between the first bottom of the first housing and the second top of the second housing and visible through the sight glass opening and the sight glass;
    a pressurized air inlet defined in the first housing and communicating with the interior of the first housing vertically above the mesh screen filter and below the planar bottom surface of the sight glass for supplying pressurized air to the interior of the first housing to force opaque viscous fluids though the mesh screen filter to cause contaminants on the mesh screen filter to be visible through the sight glass; and
    the first housing and the second housing are releasably secured to one another in fluid tight engagement with releasable fasteners extending between the first housing and the second housing.

2. The fluid filter assembly with sight glass for opaque viscous fluids of claim 1 wherein:
    the sight glass retainer has,
        a sight glass retainer top and an opposing sight glass retainer bottom, and
        defines plural spacedly arrayed arcuate openings communicating between the sight glass retainer top and the sight glass retainer bottom for passage of fluids therethrough,
        a fluid deflector spacedly adjacent each of the plural spacedly arrayed arcuate openings to disperse the viscous fluids across the mesh filter screen, and
        a sight glass support on the sight glass retainer top to frictionally engage with the planar bottom surface of the sight glass to force the sight glass into fluid tight engagement with the first housing within the sight glass bore; and
    the plural arcuate recesses defined in the second top of the second housing align with the plural arcuate openings defined in the sight glass retainer to receive viscous fluids flowing therethrough.

3. The fluid filter assembly with sight glass for opaque viscous fluids of claim 1 further comprising:
    a low pressure drain valve carried within a drain valve channel defined in the fluid filter assembly, the drain valve channel communicating between the outlet passage and an outer surface of the fluid filter assembly;
    a spring to positionally bias the low pressure drain valve to an open position within the drain valve channel to drain fluid from the fluid filter assembly to a fluid reservoir when fluid pressure is removed from the outlet passage; and
    the positional biasing of the spring is overcome when fluid pressure exists in the outlet passage causing the low pressure drain valve to move within the drain valve channel to seal against a drain valve seat closing the drain valve channel while fluid pressure exists.

4. The fluid filter assembly with sight glass for opaque viscous fluids of claim 1 further comprising:
    a bypass valve communicating between the upper housing and the lower housing to allow fluid to pass from the first housing into the second housing without passing through the mesh screen filter when fluid pressure within the fluid filter assembly exceeds a predetermined pressure.

5. The fluid filter assembly with sight glass for opaque viscous fluids of claim 4 wherein:
    the bypass valve has a ball carried in a bypass valve seat, the to pass fluids therethrough without the fluid passing through the mesh screen filter; and
    a spring biases the ball into the bypass valve seat and the biasing of the spring may be overcome to move the ball away from the bypass valve seat when fluid pressure within the fluid filter assembly exceeds a predetermined pressure.

6. The fluid filter assembly with sight glass for opaque viscous fluids of claim 1 wherein:
    the sight glass provides a means for a user to visually inspect the mesh screen filter for contaminants and particulates collected on the mesh screen filter to determine if the contaminants and particulates are from normal usage or evidence of an ongoing mechanical failure without the need to drain the liquids or remove or disassemble the fluid filter assembly.

7. The fluid filter assembly with sight glass for opaque viscous fluids liquids of claim 1 wherein:
    the second bottom of the second housing is configured to carry a removable disposable fluid filter, the second bottom of the second housing having,
        a threaded nipple housing carrying a threaded nipple to releasably engage with the removable disposable fluid filter, the threaded nipple defining a channel fluidically communicating with the second housing outlet passage and the at least one fluid outlet port, and at least one fluid channel communicating between the plural arcuate recesses defined in the second top of the second housing and the removable disposable fluid filter to allow fluid to flow into the removable disposable fluid filter.

8. The fluid filter assembly with sight glass for opaque viscous fluids of claim 7 wherein:

the second bottom of the second housing defines a groove spaced radially outwardly from the threaded nipple to engage with a seal carried by the removable disposable fluid filter to provide a fluid tight seal between the second bottom of the second housing and the removable disposable fluid filter.

9. A fluid filter assembly with sight glass for opaque viscous fluids comprising in combination:

a first housing, the first housing having,
 a first top and a first bottom,
 a sight glass opening defined in the first top communicating with a sight glass bore defined in the first bottom, and
 plural fluid inlet ports communicating between an outer surface of the first housing and an interior of the first housing for flow of opaque viscous fluids into the interior of the first housing;

a transparent sight glass carried within the sight glass bore defined in the first housing for providing user visibility into the interior of the first housing, the sight glass having a planar top surface and an opposing planar bottom surface;

a sight glass retainer carried within the sight glass bore vertically below the sight glass to positionally secure the sight glass within the sight glass bore, the sight glass retainer having,
 a sight glass retainer top and an opposing sight glass retainer bottom and defining plural spacedly arrayed arcuate openings communicating between the sight glass retainer top and the sight glass retainer bottom for passage of fluids therethrough,
 a sight glass support extending upwardly perpendicularly from the sight glass retainer top to frictionally engage with the planar bottom surface of the sight glass to force the sight glass into fluid tight engagement with the first housing within the sight glass bore;

a second housing, the second housing having,
 a second top and a second bottom,
 the second bottom of the second housing configured to releasably carry a removable disposable fluid filter, the second bottom of the second housing having,
  a threaded nipple housing carrying a threaded nipple to releasably engage with the removable disposable fluid filter, the threaded nipple defining a channel fluidically communicating with an outlet passage defined in the second housing and at least one fluid outlet port;

a mesh screen filter carried between the bottom of the sight glass retainer and the second top of the second housing and visible through the sight glass opening and the sight glass;

a pressurized air inlet defined in the first housing and communicating with the interior of the first housing vertically above the mesh screen filter and below the planar bottom surface of the sight glass for supplying pressurized air to the interior of the first housing to force opaque viscous fluids though the mesh screen filter to cause contaminants on the mesh screen filter to be visible through the sight glass; and the first housing and the second housing are releasably secured to one another in fluid tight engagement with releasable fasteners communicating therebetween.

* * * * *